United States Patent
Garfield (10) Patent No.: US 7,610,877 B2
(45) Date of Patent: Nov. 3, 2009

(54) LITTER BOX CONTAINMENT SYSTEM

(76) Inventor: Lynn Ellen Garfield, 322 Browning La., Cherry Hill, NJ (US) 08003

( * ) Notice: Subject to any disclaimer, the term of this patent is extended or adjusted under 35 U.S.C. 154(b) by 442 days.

(21) Appl. No.: 11/243,800

(22) Filed: Oct. 5, 2005

(65) Prior Publication Data
US 2006/0102084 A1    May 18, 2006

Related U.S. Application Data

(60) Provisional application No. 60/619,740, filed on Oct. 18, 2004.

(51) Int. Cl.
*A01K 1/01* (2006.01)
(52) U.S. Cl. ....................................... 119/170
(58) Field of Classification Search ................ 119/170, 119/162, 165, 166, 167, 168, 169, 161, 28.5; D30/161; 472/126
See application file for complete search history.

(56) References Cited

U.S. PATENT DOCUMENTS

| | | | | |
|---|---|---|---|---|
| 1,773,141 A | * | 8/1930 | Ensley | 119/165 |
| 2,238,982 A | * | 4/1941 | Norton | 119/28.5 |
| 2,529,951 A | * | 11/1950 | Kaye | 5/99.1 |
| 3,831,557 A | | 8/1974 | Elesh | |
| 4,271,544 A | | 6/1981 | Hammond | |
| 4,299,190 A | * | 11/1981 | Rhodes | 119/170 |
| 4,576,364 A | * | 3/1986 | O'Fearna | 256/24 |
| 4,766,845 A | | 8/1988 | Bavas | |
| 4,787,335 A | | 11/1988 | Carlyon | |
| 4,870,924 A | | 10/1989 | Wolfe | |
| 4,919,078 A | * | 4/1990 | Morrison | 119/168 |
| 4,951,605 A | * | 8/1990 | Brown | 119/165 |
| 4,986,217 A | | 1/1991 | Robinson et al. | |
| 5,134,974 A | * | 8/1992 | Houser | 119/168 |
| 5,148,771 A | | 9/1992 | Schuett et al. | |
| 5,293,837 A | | 3/1994 | Caldwell | |
| 5,590,623 A | | 1/1997 | Toole et al. | |
| 5,615,639 A | | 4/1997 | Knight | |
| 5,617,681 A | * | 4/1997 | Lyons | 52/82 |
| 5,636,593 A | * | 6/1997 | Vito | 119/165 |
| 5,713,302 A | | 2/1998 | Walter | |
| 5,785,001 A | | 7/1998 | Robinson | |
| 6,332,429 B1 | | 12/2001 | Gramlich | |
| 6,338,314 B1 | * | 1/2002 | Widrich | 119/28.5 |
| 6,415,738 B1 | | 7/2002 | Hotter | |
| 6,474,262 B1 | | 11/2002 | Ceccon | |
| 6,561,130 B1 | | 5/2003 | Sage, Jr. | |
| 6,848,394 B1 | * | 2/2005 | Sexton | 119/170 |
| 6,907,842 B2 | * | 6/2005 | Godshaw | 119/28.5 |
| 6,994,054 B2 | | 2/2006 | Matsuo et al. | |

(Continued)

OTHER PUBLICATIONS

Petmate Litter Box with Rim—(Jan. 4, 2004).

(Continued)

*Primary Examiner*—Yvonne R. Abbott
(74) *Attorney, Agent, or Firm*—Cheryl F. Cohen (57) ABSTRACT

A litter box containment system is disclosed. The system provides an extension or enclosure that adapts to an existing litter box, and increases the height of the sides, serving to keep in animal waste and litter. The system also provides for multiple possible entrances that provide easy access for an animal, while still providing extended protection against escaping animal waste and litter.

18 Claims, 6 Drawing Sheets

U.S. PATENT DOCUMENTS

| | | |
|---|---|---|
| D527,498 S | 8/2006 | Lewis, II |
| 2005/0284399 A1 | 12/2005 | Asma |
| 2006/0042548 A1* | 3/2006 | Tharalson et al. .......... 119/28.5 |
| 2008/0178818 A1* | 7/2008 | Aley .......................... 119/165 |

OTHER PUBLICATIONS

Iris 301504 NA—400N Open Cat Litter Box w/ Litter Guard—(Sep. 15, 2007)(release date).

* cited by examiner

LITTER BOX CONTAINMENT SYSTEM

CROSS REFERENCE TO RELATED APPLICATIONS

This application claims the benefit of U.S. Provisional Application No. 60/619,740, filed Oct. 18, 2004 and is incorporated herein in its entirety, to the extent not inconsistent herewith.

FIELD OF THE INVENTION

The present invention relates to an apparatus that can be adapted to and used together with a litter box to prevent an animal from depositing or dispersing liquid or solid waste beyond the perimeter of the interior of the litter box.

BACKGROUND

Some pets, due to their height or where they position themselves within the litter box, eliminate waste over the edge of the litter box, which waste is then deposited outside of the box. Various products have been introduced to address this problem. However, these products have shortcomings that make them unacceptable to some pet owners.

One of the products available is the covered litter box, which consists of a litter box and an enclosure which attaches to the upper rim of the litter box and completely encloses it except for one entrance opening into the box. However, it is also known that there are certain problems associated with this type of covered box. The inner walls and bottom rim of the detachable cover can become soiled with waste, and must be cleaned from time to time. The large size and shape of the cover make it impractical for some pet owners to clean in a standard sized utility sink. While liners exist to protect the litter box pan, the enclosed cover has no disposable liner or means to attach a liner to the inner sides to provide for easy cleanup and maintenance. Furthermore, urine can collect in the transitional area where the cover rests on the litter box. It can then leak to the outside of the box through the transitional area, or when the cover is removed for cleaning. The litter within the litter pan should be changed or have the waste scooped out on a regular basis. When the litter box is enclosed by a cover, the cover must be removed in order to scoop waste out of the litter. If the cover is clamped to the frame, some of the clamping devices are difficult to disengage. The removal of the cover can be a cumbersome extra step which can be a deterrent to scooping out the litter on a regular basis. Furthermore, with the cover on the box, one cannot readily see if there is waste to be scooped out. The loss of this visual reminder can also be a deterrent to scooping the litter regularly. Cats are sensitive to odor and the concentrated odor contained within a covered litter box can be offensive to some cats to such degree that they stop using the litter box. Tall or large cats may find the covered box too confining, and some pets for unknown reasons do not want to enter them. Another disadvantage of the covered box is that because the location of the entryway into the box is fixed, and because the cover is rather high, there are limitations as to where the covered litter box can be oriented and placed within the house.

An uncovered litter box is known which has relatively high, permanently attached sides. Such bulky shape does not allow easy cleaning in a standard sized utility sink. The currently available litter pan liners are sized for standard-height litter boxes, and may not fit the extra large or high-sided litter boxes. Some of these high-sided litter boxes also have an entry opening into the box which is higher than an average rim for the animal to step over. This can be a problem for young, small, injured, older, and less agile pets. Another product on the market has a detachable 'lip' that locks onto the upper rim of the litter box and extends out horizontally a few inches from the rim to catch stray litter. This attachment does not extend the sides vertically to effectively prevent waste from overshooting the litter box.

Accordingly, there is a need to provide an apparatus that prevents animal waste and litter from escaping from the litter box, and also allows easy cleanup and maintenance, flexible orientation, and can provide side-barrier protection, even to a low-sided litter pan.

SUMMARY OF THE INVENTION

The present invention pertains to a system that alleviates the problems mentioned above. The system comprises an open-topped containment, such as formed by a frame or walled containment enclosure, and could hold and support a disposable liner. The containment system is securely supported on or around a standard litter box. The Litter Box Containment System of the present invention may also be referred to as a "surround" or "litter box surround".

One aspect of the invention is to provide a surround for a standard litter box that alleviates the problems mentioned above, in particular overshooting the confines of the litter box by the animal and thus depositing urine, feces, or spray outside of the box. It also alleviates the problem of waste and litter being tossed outside the bounds of the litter box by an animal that digs vigorously in the litter. Another aspect of the invention is to provide an open top to allow easy access for scooping out litter. The shape of the surround is less bulky than that of a litter box cover, making it easier to clean in a small utility sink. A disposable liner can help keep the supporting elements of the surround clean and create a barrier to contain waste within the litter box. The bottom edge of a disposable liner, if used, hangs below the upper rim of the litter box, along the inside, to prevent liquid from dripping outside the litter box.

Further, it is an aspect of the invention to provide a Litter Box Containment System that can provide side barrier protection to standard litter boxes. Spaces that require a small litter box, such as a cage in a shelter, can have the advantage of side-barrier protection added to a small litter box. If a small or injured animal requires a low-sided pan for ease of access, the litter box surround need not add height to the entry opening.

Yet another aspect is to provide a Litter Box Containment System that does not confine the pet beneath a cover while using the litter box.

Even further, another aspect of the invention is to provide a Litter Box Containment System that does not confine odors to an area within the box.

The present invention provides a litter box surround that is adapted to fit the size and particular shape of most commercially available litter boxes. The surround extends the sides of a litter box above the normal height, while providing an optionally re-locatable entranceway. Providing a flexible entry location allows the litter box to be oriented according to the needs of the surroundings or the pet. The open top of this configuration allows the litter box to be placed where a covered box might not fit, as under a sink where a drain pipe might interfere with placement of a covered litter box.

The Litter Box Containment System does not interfere with and helps to hold a standard bottom litter pan liner in place if such a liner is used. The surround system may be removed and placed back into a secure position on or around the litter box with ease.

One embodiment of the present invention provides a frame manufactured from a resilient plastic material or the like. A disposable liner, manufactured from a fluid impermeable, pliable material such as plastic or vinyl can be used in conjunction with or as a component of the litter box surround system.

Another embodiment of the present invention provides upright supports which securely engage the rim of the litter box. A disposable liner is attached to the upright supports covering their interior aspects, and creating a side barrier including an opening between two supports to provide an entranceway into the litter box.

Another embodiment of the invention is made of solid side panels which allows the panels to function as a barrier without the optional liner. In this embodiment, the inside bottom edge of the panels can have a ledge that extends down below the upper rim of the litter box along the inside of the litter box far enough so that no waste can escape. In the embodiment which has solid side panels, the panels may be hinged or attached to each other at the corners or sides. The hinges may be those which allow total disassembly of the panels. Any known hinging or attachment means is contemplated.

The surround system may be constructed in a manner to be a fixed size or in a manner to be variable in size by means of members or panels that are adjustable. The surround system may be constructed of separate components that attach together by some means of connection which would allow the litter box surround system to be stored or shipped in a disassembled or flattened form. It may be constructed of separate components that connect together for assembly, or are hinged or attached in a way that allows the surround system to unfold into a three-dimensional configuration.

The attachment means for the liner may be any suitable known means of attachment such as, but not limited to, clamps, spring clips, magnetic fasteners, tethered bullet nosed fasteners, adhesive strips, tape, hook and loop material, or hooks. The liner also may be formed to drape over the top of the frame, upright supports, or panels.

Standard litter box bottom liners are commonly placed in the litter box to keep the bottom of the box clean and provide easy disposal of soiled litter. The present invention, on the upper rim of the litter box, does not interfere with the use of standard litter box bottom liners which drape over the upper edge of the litter box. If the surround system is positioned over the standard litter box bottom liner, it helps to hold that liner in place. The side barrier liner for the litter box surround is part of the present invention and covers the inner sides of the surround and extends below the upper rim of the litter box. For the purposes of this summary, this type of liner is referred to as a "side liner." However, an additional embodiment is contemplated that incorporates an overall protective liner that protects both the litter pan and the surround in one piece. For the purposes of this summary, this "overall" liner will also be referred to as a "full" liner. By providing a full liner, one has the option to use one liner instead of two, i.e. one for the bottom of the litter pan and one for the side surround. The full liner can provide at least one area which may be formed into an entry opening, such as a perforated area. The liner also may incorporate one or more preformed openings that can be left open, or can be closed, such as by sealing a flap with an adhesive strip or tape.

The present invention can be manufactured to exactly fit the shape of the upper rim of a specified litter box, or it can be more generic in how it fits on the litter box. To accommodate variations in the curvature of the upper rim of various litter boxes, the surround system can incorporate a flat bottom surface which rests on top of the upper rim of the litter box, and which is held securely in place by means, such as but not limited to, flanges, ledges, or brackets that extend down from the bottom of the surround system, and extend below the upper rim of the litter box. If the lip or flange is on the inner wall of the litter box, it could be covered by the lower edge of the disposable liner to protect it from waste.

Other aspects of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

DETAILED DESCRIPTION

Figure 1A:
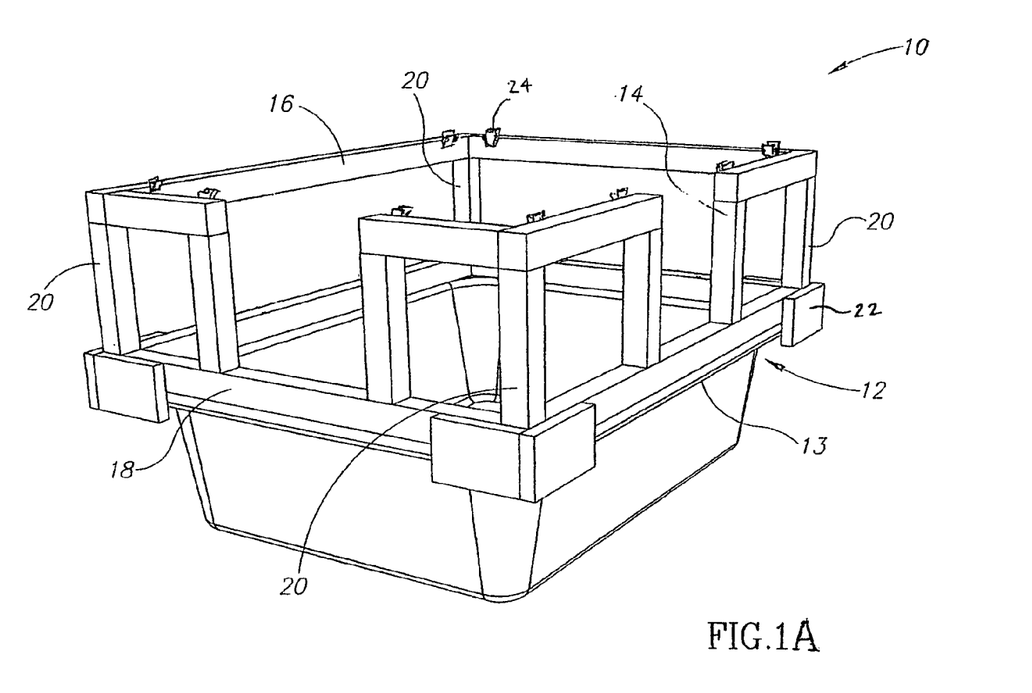
FIG. 1A illustrates one embodiment of a litter box surround positioned on a standard litter box without a liner.
Figure 1B:
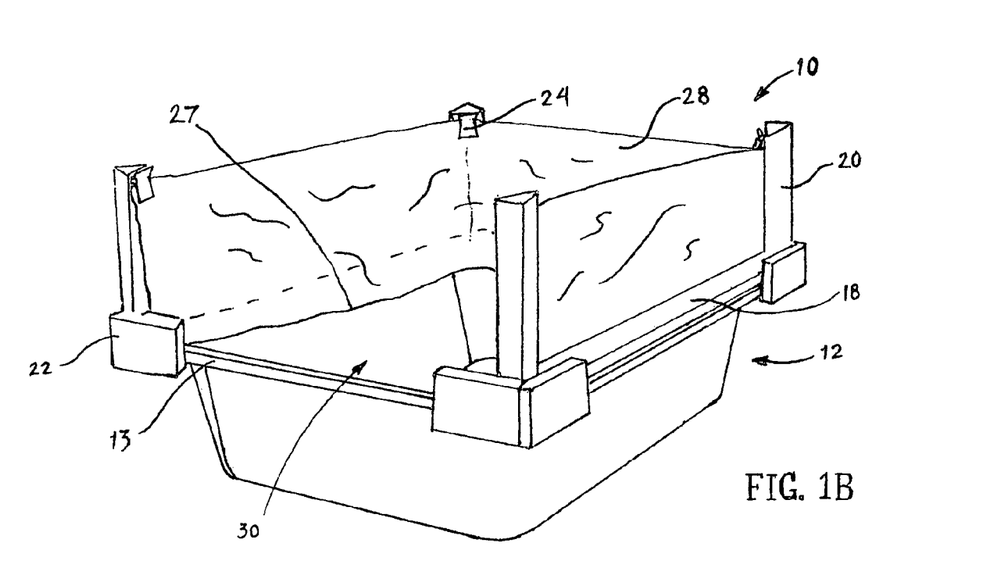
FIG. 1B illustrates a perspective view of one embodiment of the litter box surround on a standard litter box with a side liner extending down below the upper rim of the litter box.

FIGS. 1A and 1B illustrate the present invention, comprising a frame 10 positioned on a top rim 13 of a commercially available litter box 12. The height of the frame 10 is sufficient to prevent waste from being displaced out of the litter box 12. One embodiment of the present invention provides a frame 10 including a plurality of upright members 20, each of the upright members 20 connected to the adjacent upright member by a top horizontal cross member 16 and a bottom horizontal cross member 18. The bottom cross member 18 is formed to engage with the rim 13 of the litter box 12 so as to be structurally stable on the litter box 12. The bottom cross member 18 may be flat and include at least two corner brackets 22 extending down from a bottom cross member 18 which has no specific bottom profile. The corner brackets 22 serve to stabilize the surround on the rim 13 of the litter box 12.

In FIG. 1B, the depicted embodiment shows a frame 10 with a releasably attached side liner 28 covering the inner surface of the frame 10 on three sides. One side is left unlined to create an entry opening 30. This embodiment shows a plurality of upright members 20 which connect to adjacent upright members 20 by a plurality of bottom cross members 18. In this embodiment, there is no bottom cross member 18 on the side of the frame 10 which has the entry opening 30. Each of the upright members 20 has a fastener 24 located on the inner surface near the top of the upright member 20. The side liner 28 extends downward from the fasteners 24 along the inner surface of the frame 10. The bottom edge 27 of the side liner 28 hangs below the upper rim 13 of the litter box 12. A plurality of brackets 22 extend down from the bottom cross members 18 far enough below the upper rim 13 of the litter box 12 to prevent the frame 10 from moving back and forth or side to side on the litter box 12.

Figure 2A:
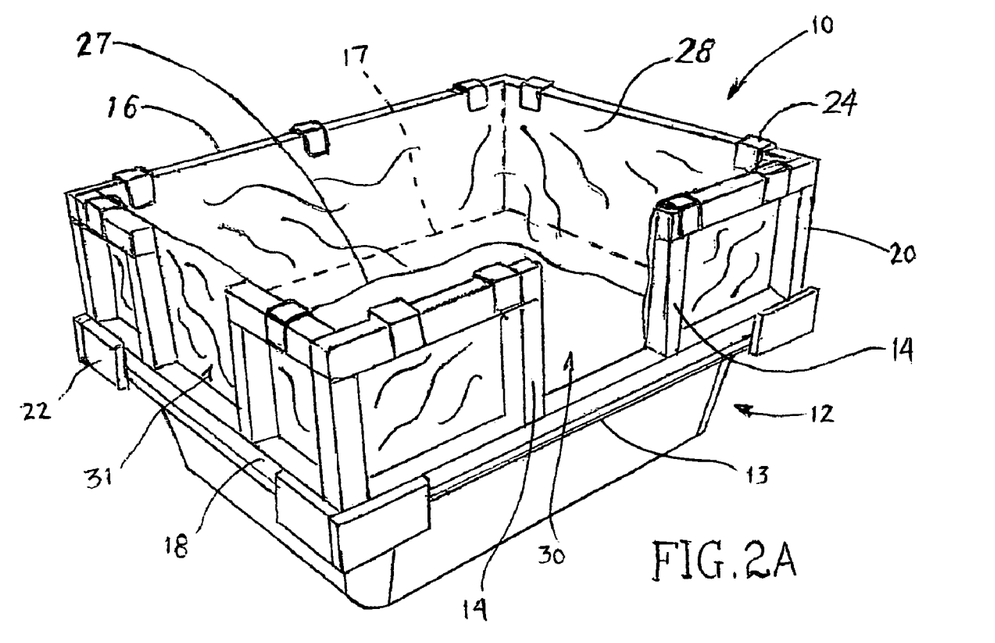
FIG. 2A illustrates a perspective view of the embodiment of FIG. 1A including a side liner covering the inner surface of the surround frame and extending down below the upper rim of the litter box.
Figure 2B:
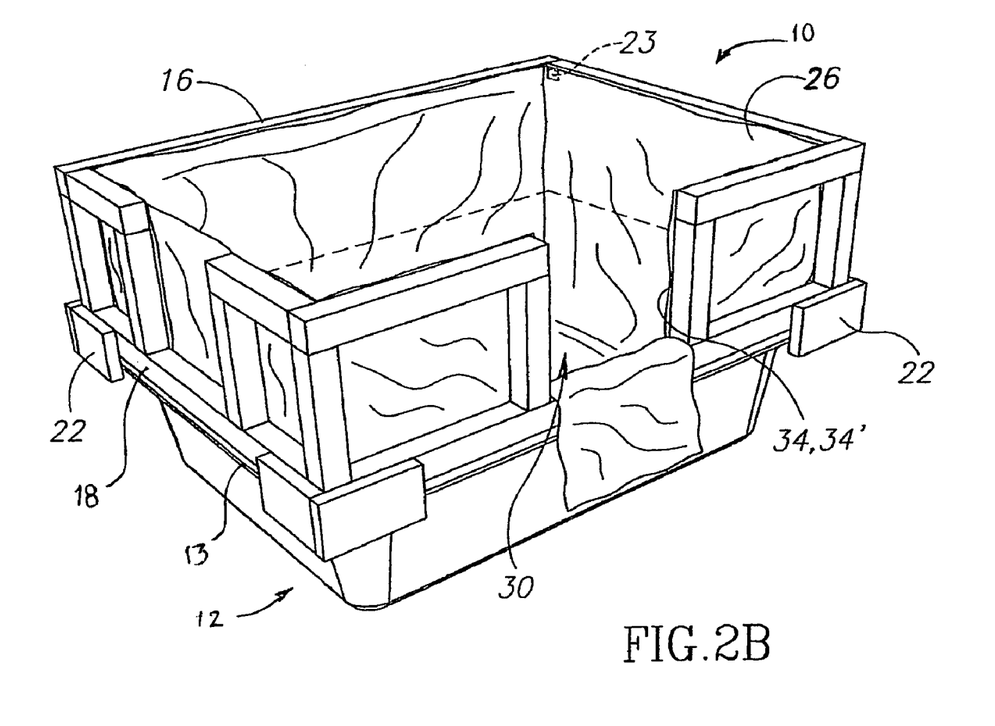
FIG. 2B illustrates a perspective view of the embodiment of FIG. 1A including a full liner covering the inner surface of the surround and the litter box.

As seen in FIG. 2A, on the interior surface of the frame 10, a side liner 28 is extended downward from the frame 10 into the litter box 12. It is important that the bottom edge 27 of side liner 28 extends below rim 13 where the frame 10 meets the litter box 12. This serves to prevent waste from escaping through the transition area 17 where the surround frame 10 meets the litter box 12. Fasteners 24 may be used to attach the liner 28 to the frame 10. The embodiment shown in FIG. 2A includes a removable side liner 28 that is fastened to the top cross member 16 such that the removable liner extends at the inside of the top cross members 16 down below the upper rim 13 of the litter box 12, see also FIG. 3A. FIG. 2B shows an overall, or full liner 26 which covers the entire inside surface of the litter box 12 and extends upward to form the liner 26 for the frame 10. At least one opening 30 is provided in the removable full liner 26 as shown in FIG. 2B.

The frame 10 of FIG. 2A shows an embodiment with a side liner 28, which is attached by a fastener 24 at upright member 14 which forms one side of the entry opening, and the side liner 28 continues around the inner surface of the frame 10 and attaches to the upright member 14 that forms the other side of the entry opening 30. FIG. 2A shows that the side liner 28 has been draped in a manner to allow the frame opening 30 on the long side of the box to remain open, while the liner covers the optional frame opening 31 on the short side of the box. In this embodiment, frame 10 includes four upright members 20, one positioned in each corner of the frame 10. The bottom cross member 18 includes four corner brackets 22 for engaging with the rim 13 of the litter box 12 and stabilizing the frame 10. It is also possible to use only two corner brackets 22 positioned diagonally from one another to provide stability (not shown). It is also possible to use stabilizing downward extensions 39 in locations other than the corners, see FIG. 4A.

FIG. 2B shows that the removable liner 26 is fastened to the inside of the top cross member 16 with adhesive tape 23. Fastener 24, shown in FIG. 2A can be implemented by a variety of fastening means, including, but not limited to, clamps, clips, hook and loop fastener, or tape.

As mentioned above, an opening 30 is provided for the pet to enter the litter box 12. An opening 30 is provided in the frame 10 and an opening in the full liner 26 is formed by two vertical cut lines 34 or perforated vertical areas 34' that can be pulled open. The opening can also be formed by a flap which can be left open or sealed closed with an attached adhesive strip along each vertical edge covered by a removable material that covers the adhesive strip if the flap is to be left open (not shown). The opening 30 may be left open by folding the liner over the box as shown in FIG. 2B.

Figure 3A:
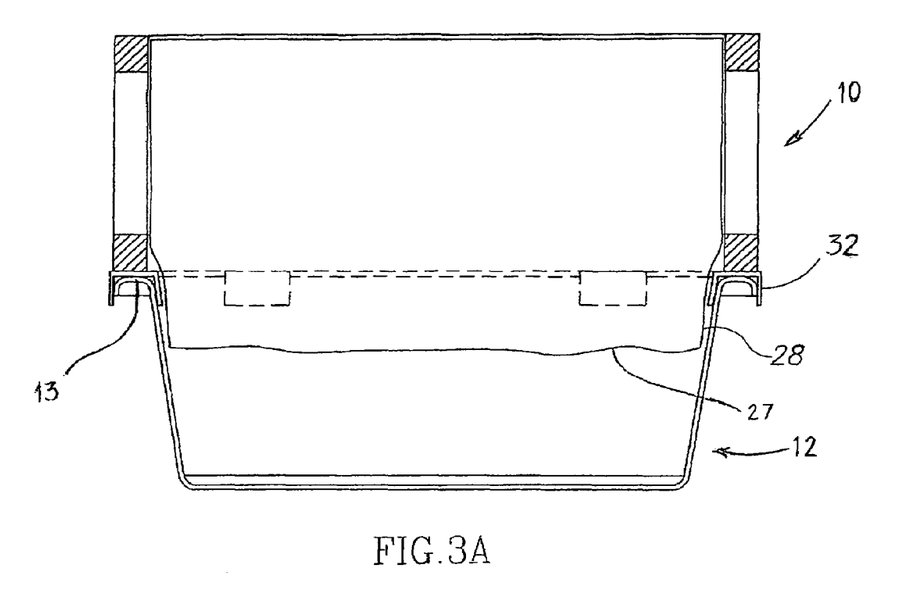
FIG. 3A illustrates a cross-sectional view of an embodiment with a side liner covering the inner surface of the surround frame and extending below the upper rim of the litter box.
Figure 3B:
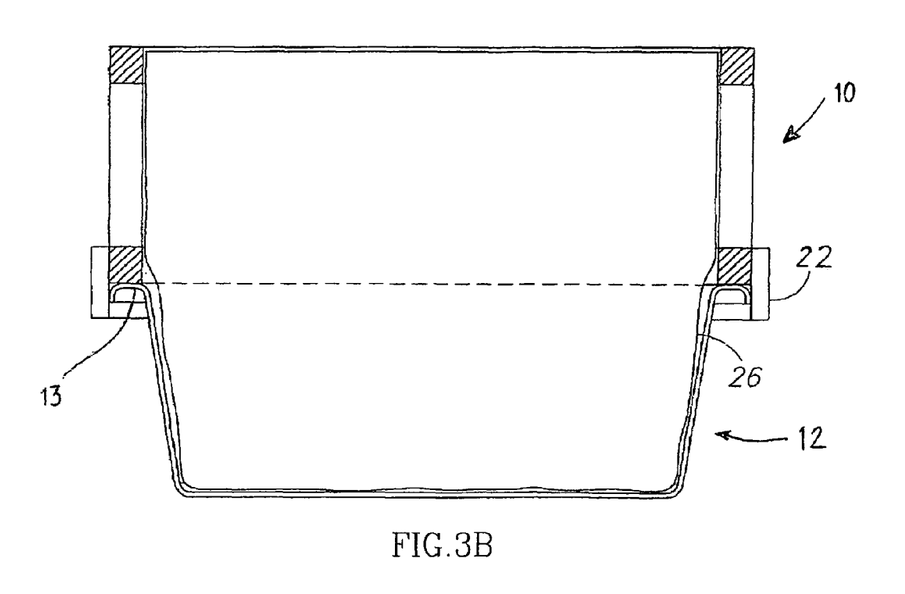
FIG. 3B illustrates a cross-sectional view of an embodiment with an overall liner covering the inner surface of the surround frame and the litter box.

As discussed, in the embodiment shown in FIG. 2B, the removable full liner 26 is a bag having a bottom which is dimensioned to cover the entire inner surface of the litter box 12 and which has sides that extend up to the top cross member 16 of the surround frame 10, see also FIG. 3B. This type of full liner 26 may be attached to the top cross member 16 in the same way in which the side liner 28 is attached, that is by clamping 24, with adhesive tape 23, or any other fastening means.

As shown in FIG. 3A, the bottom 32 of the frame 10 may be formed to engage with the upper rim 13 of the litter box 12 in a secure manner. In another embodiment, the bottom 32 of the frame 10 may be manufactured with a ledge (not shown) that extends down below and along the inner or outer surface of the rim 13 of the litter box 12.

FIG. 3B shows downward extensions 22 that extend below the rim 13 of the inner and/or outer surface of the litter box 12 to stabilize the frame 10 on the litter box 12.

Figure 4A:
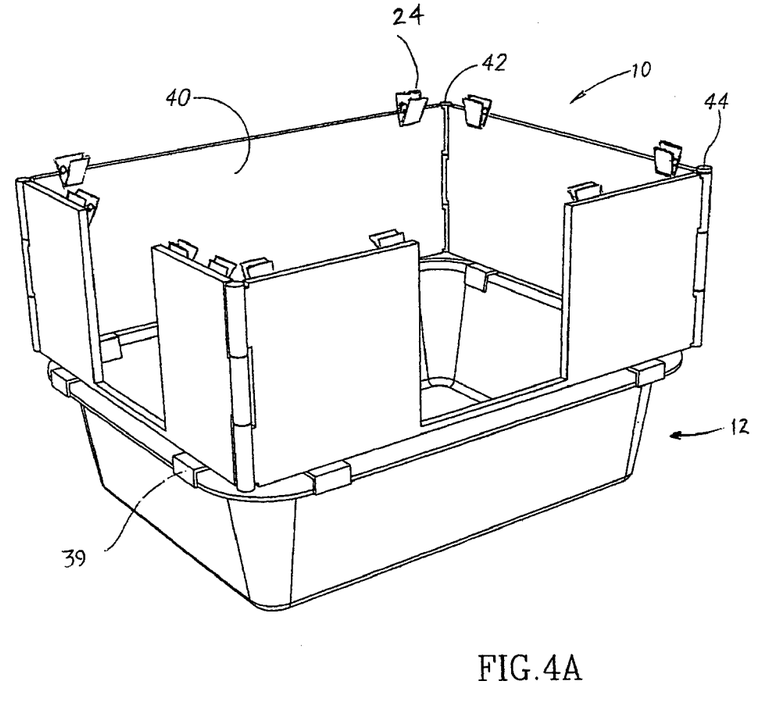
FIG. 4A illustrates a perspective view of an embodiment of the surround system including hinged solid side panels and a choice of entry openings.

Another embodiment shown in FIG. 4A is contemplated, in which the present invention comprises a plurality of solid panels 40 attached in a serial manner to create walls that extend above the top of litter box 12. The panels 40 can be permanently or releasably attached to the adjacent panel(s). This embodiment illustrates panels 40 connected by hinges 42. At least one hinge 42 may include a removable pin 44 so that the plurality of solid panels 40 can be flattened. A liner can be attached by means of fasteners 24. A plurality of stabilizing downward extensions 39 may be used to stabilize frame 10 on the litter box 12.

Figure 4B:
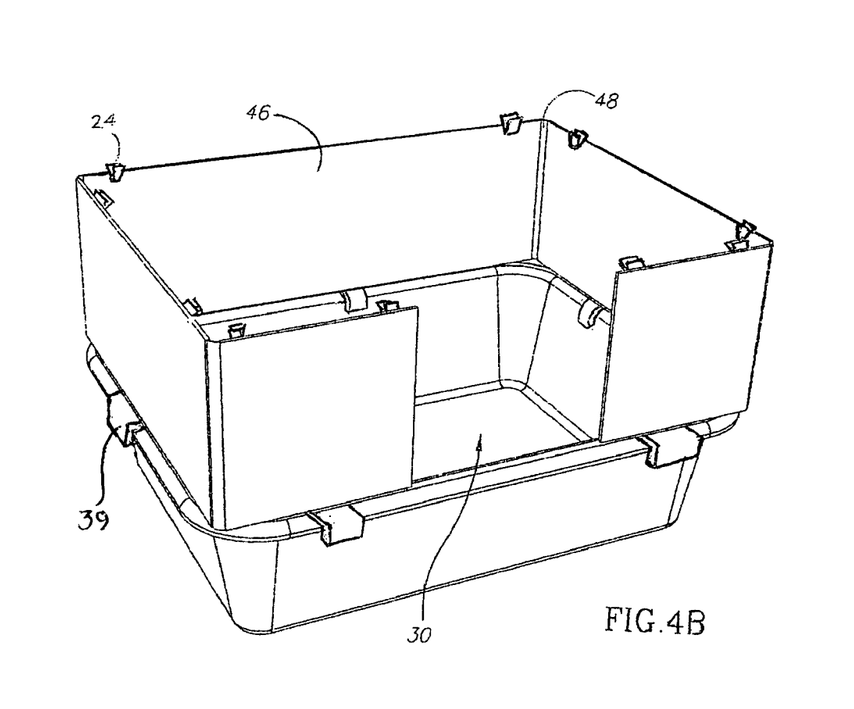
FIG. 4B illustrates a perspective view of yet another embodiment of the surround system including folding solid side panels.

Yet another embodiment of the surround as shown in FIG. 4B may include solid side panels 46 which are permanently connected and can be secured on or around a litter box. In the embodiment shown, where the adjacent panels 46 attach, there is a vertical weakened area 48 that is suitable for folding the solid panel 46 at the area 48 to either form a surround, or to fold it flat. It is possible to use a disposable liner (not shown) such as 26 or 28 attached with fasteners 24 with the solid panel surround in a similar fashion as discussed regarding the other embodiments. The entry opening 30 into the box can be formed by one or more openings 30 in the solid panels 46, or by having two of the panels 46 left unconnected, as in a three-sided embodiment such as that illustrated in FIG. 1B.

Figure 5:
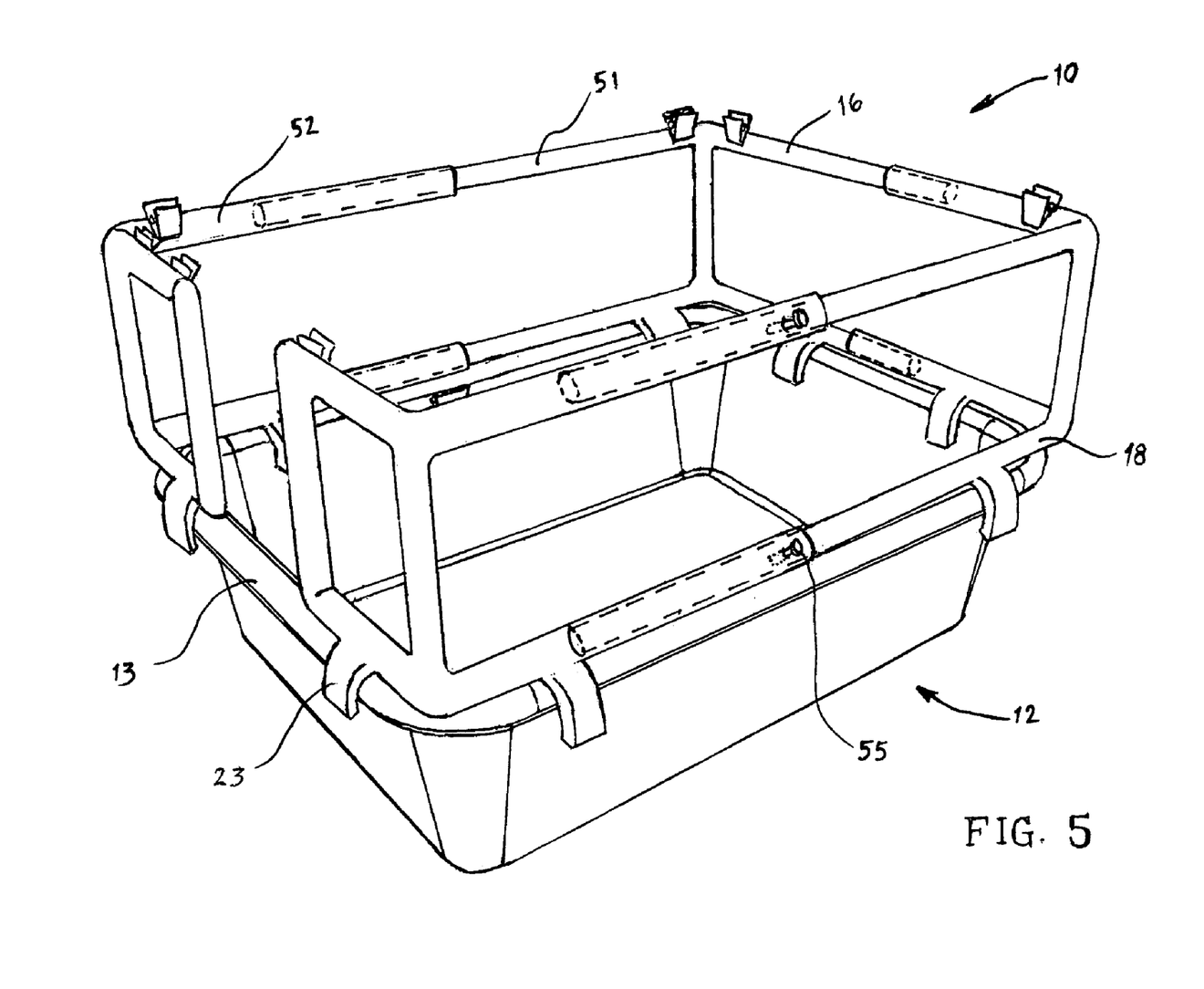
FIG. 5 illustrates another embodiment of the surround system with an adjustable size frame positioned on a standard litter box.

Another embodiment of the frame 10 shown in FIG. 5 is contemplated in which the frame 10 is made of adjustable cross members 16 and 18, thereby making frame 10 adjustable in size. The cross members may comprise adjacent parts of different thicknesses, such that the thinner part 51 fits into a hollow area within the thicker part 52, and the parts 51 and 52 releasably interlock to a fixed position relative to each other by some means, such as a locking screw 55 which tightens against the inner part 51. While this drawing showed a specific adjustment means, those skilled in the art will recognize that there are a variety of possible adjustment means that can be used without departing from the scope and purpose of the disclosed invention. The bottom cross members 18 have extensions 23 that curve around the litter box rim 13 to stabilize the frame 10 on the litter box 12.

Figure 6A:
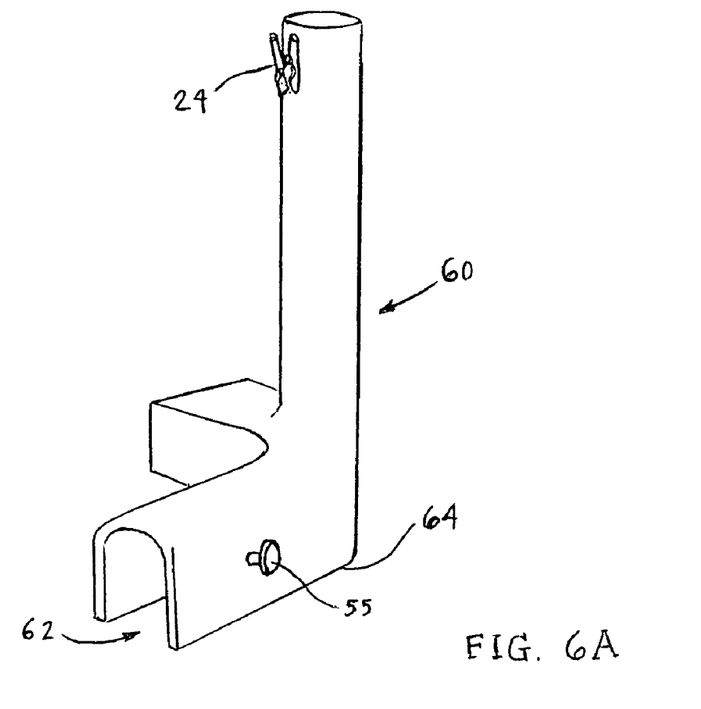
FIG. 6A illustrates a corner support.
Figure 6B:
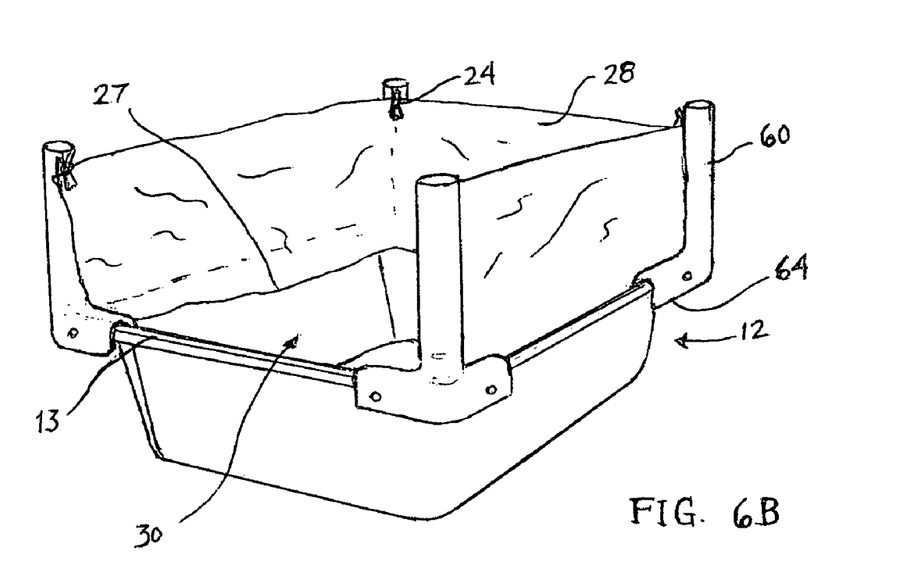
FIG. 6B illustrates another embodiment of the present invention that uses the corner support of FIG. 6A.

Yet another embodiment of the surround is shown in FIG. 6A and FIG. 6B. A free standing upright support 60 can be secured in each corner of a standard litter box 12. The bottom 64 of the support 60 has an L-shaped channel 62 that curves to fit the rim 13 and corner of the litter box 12. The upright support 60 can have a means to secure it to or against the litter box 12, such as an adjustment screw 55. As shown in FIG. 6B, the upright support 60 has a fastener 24, which is used to attach a removable liner 28 which is draped down from the fasteners 24 along the inner surface of the supports 60. An entry opening 30 is formed by leaving one area between two supports 60 undraped by the liner 28. The bottom 64 of the upright support 60 is formed in a manner to engage securely with the upper rim 13 of the litter box 12.

It is understood that the frame or panels of the present invention can be manufactured in many variations, including, but not limited to:

Fixed in size, with permanently attached pieces;

Adjustable in size so the user can customize the length, width, and/or height of the frame or panels by such means as telescoping horizontal and/or vertical members with a ratcheted or locking system or attachment to stabilize or fix the desired dimensions;

or horizontal, vertical, or combination configuration of frame members that can be attached together at more than one point or configuration to allow for size adjustment;

or varying sized horizontal and/or vertical members that can be attached together to adjust the length and/or width of the frame or panels.

The frame or panels can be manufactured as one piece; or as multiple parts or pieces that may include hinges, may be adjustable in size, or may be detachable, to allow the frame or panels to be collapsed or folded for cleaning or in order to take up less shelf, storage, packaging, or shipping space.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A litter box containment system comprising a frame having a plurality of sides, said frame having a liner positioned within the interior of said frame, an open top, means for stabilizing said frame so as to only rest on an upper rim of a litter box, and fastening means for fastening said liner to said frame; wherein said stabilizing means includes at least one flange or rim extending downwardly from the bottom of the frame along a portion of each of said plural sides, each of said flange or rim extending below the upper rim of the litter box; wherein the sides of the frame form an open structure and said liner is attached to said frame thereby forming at least one wall.

2. The litter box containment system of claim 1, wherein said frame is open on one side, and said liner is attached to said frame on the other sides, thereby forming walls.

3. The litter box containment system of claim 2, wherein said frame is adapted so that an opening allowing an animal to pass through is relocatable to at least two of the sides.

4. The litter box containment system of claim 1, wherein said liner is attached to said frame on all sides, thereby forming walls, wherein an opening is formed in at least, one of said walls, thereby allowing an animal to pass through.

5. The litter box containment system of claim 4, wherein said frame is adapted so that the opening allowing the animal to pass through is relocatable to at least two of the sides.

6. The litter box containment system of claim 1, wherein said liner is attached to said frame, said liner completely covering the interior of said litter box, whereby the liner has a closed bottom.

7. The litter box containment system of claim 1, wherein said stabilizing means includes one or more stabilizing extensions that secure the containment system to or around the litter box.

8. The litter box containment system of claim 1, further including means for changing the size of each of said sides of said frame.

9. The litter box containment system of claim 8, wherein said changing means includes a means for fixing or securing said sides at a particular size.

10. A litter box containment system comprising a frame having a plurality of sides, said frame having a liner positioned within the interior of said frame, an open top, means for releasably securing said frame to or around a litter box, and fastening means for fastening said liner to said frame, wherein said liner is attached to said frame, said liner extending to a position below said rim of said litter box, and having an open bottom.

11. A litter box containment system comprising a plurality of walls, said walls arranged in a serial manner and means for stabilizing said walls so as to rest on an upper rim of a litter box, at least one of said walls having an opening, thereby allowing an animal to pass through, wherein said stabilizing means includes at least one flange or rim extending downwardly from the bottom along a portion of each of said walls, each of said flange or rim extending below the upper rim of the litter box.

12. The litter box containment system of claim 11, wherein each said wall is connected to adjacent walls by a hinge.

13. The litter box containment system of claim 12, wherein at least one said hinge includes a removable pin, whereby the plurality of walls can be disassembled.

14. The litter box containment system of claim 11, wherein each said wall is connected to adjacent walls by a vertically oriented weakened area, whereby the plurality of walls are foldable at each said weakened area, thereby making the plurality of walls suitable for folding.

15. The litter box containment system of claim 11, further including means for changing the size of each of said sides of said frame.

16. The litter box containment system of claim 15, wherein said changing means includes a means for fixing or securing said sides at a particular size.

17. The litter box containment system of claim 11, wherein said stabilizing means includes one or more stabilizing downward extensions that secure to the litter box or sides of the litter box.

18. The litter box containment system of claim 11, wherein a liner is positioned within the interior of said walls, and fastening means for fastening said liner to said walls is provided.

* * * * *

UNITED STATES PATENT AND TRADEMARK OFFICE
CERTIFICATE OF CORRECTION

| | | |
|---|---|---|
| PATENT NO. | : 7,610,877 B2 | Page 1 of 1 |
| APPLICATION NO. | : 11/243800 | |
| DATED | : November 3, 2009 | |
| INVENTOR(S) | : Lynn Ellen Garfield | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 711 days.

Signed and Sealed this

Twelfth Day of October, 2010

David J. Kappos
*Director of the United States Patent and Trademark Office*